SORTING SYSTEM FOR MULTIPLE BIT BINARY RECORDS

Filed March 3, 1964 6 Sheets-Sheet 1

INVENTOR
Philip N. Armstrong
By Keith D. Beecher
Attorney

Record Word

Blank Word

INVENTOR:
Philip N. Armstrong
By Keith D. Beecher
Attorney

Fig. 4 (Sorting Module System)
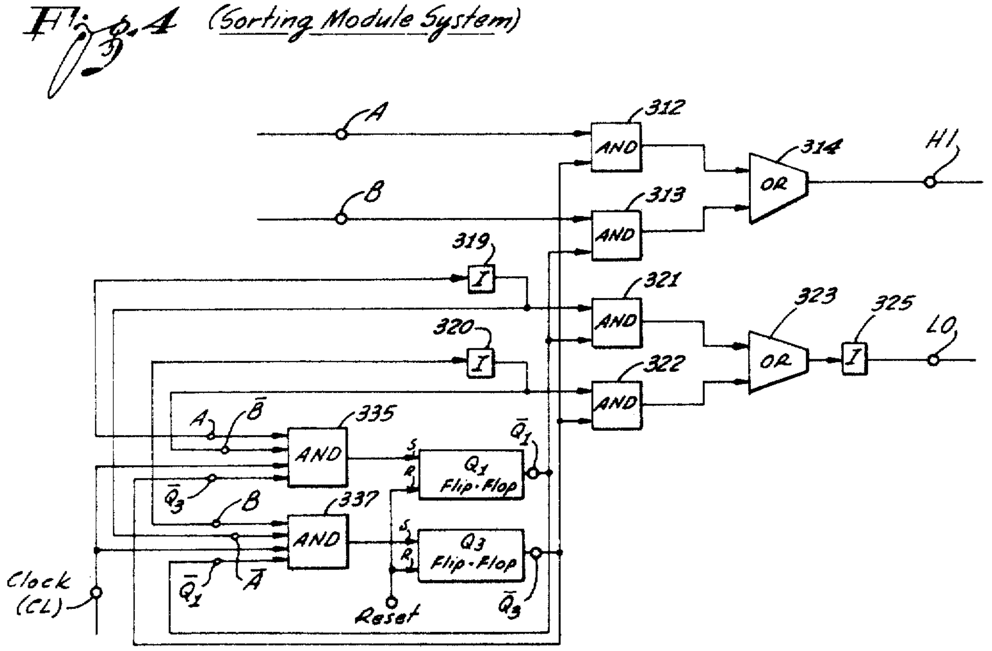
Fig. 5
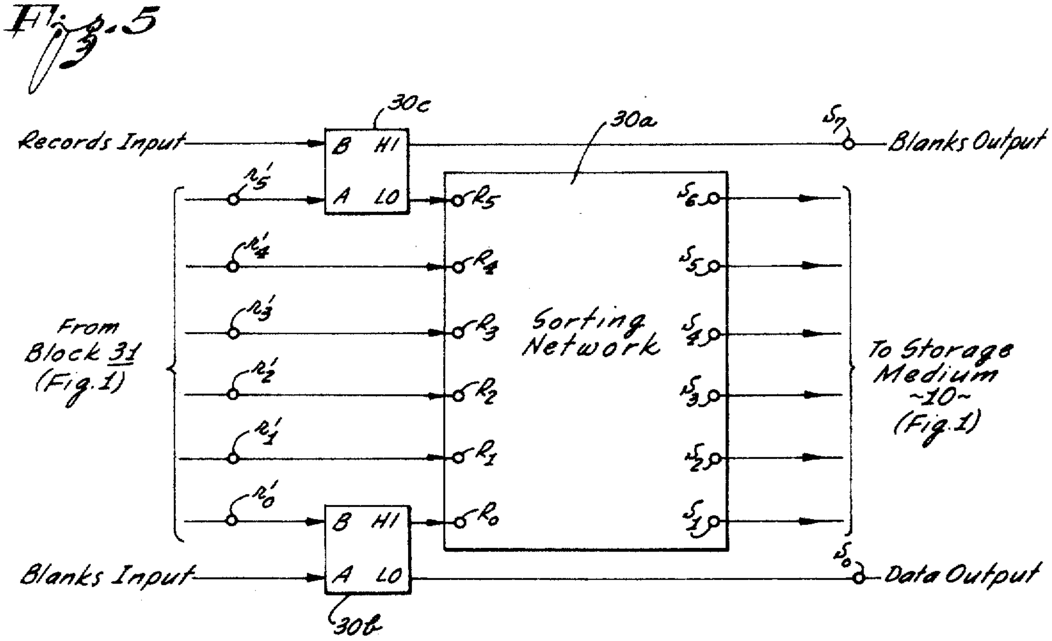
INVENTOR:
Philip N. Armstrong
By Keith D. Beecher
Attorney

SORTING SYSTEM FOR MULTIPLE BIT BINARY RECORDS

Filed March 3, 1964 6 Sheets-Sheet 4

INVENTOR:
Philip N. Armstrong
By Keith D. Beecher
Attorney

SORTING SYSTEM FOR MULTIPLE BIT BINARY RECORDS

Filed March 3, 1964

INVENTOR.
Philip N. Armstrong
By Keith D. Beecher
Attorney.

INVENTOR.
Philip N. Armstrong
By Keith D. Beecher
Attorney

United States Patent Office 3,329,939
Patented July 4, 1967

3,329,939
SORTING SYSTEM FOR MULTIPLE BIT BINARY RECORDS

Philip N. Armstrong, 17331 Keegan Way, Santa Ana, Calif. 92705

Filed Mar. 3, 1964, Ser. No. 349,539
7 Claims. (Cl. 340—172.5)

The present invention relates to data processing systems, and it relates more particularly to an improved system of the electronic data processing type which is capable of sorting into ascending or descending sequences binary-coded record words identified, for example, by binary-coded key signals.

The improved sorting system of the invention finds utility, for example, for sorting record words containing a data field of binary-coded data, each of which is identified by a binary-coded multi-bit key signal in a corresponding control field. The records are fed into the sorting system of the invention serially, and the sorting system responds to the key signal of each record to effectuate a sorting operation on the records.

The operation of the sorting system of the invention requires that each record be fed into the system in a manner such that its control field will be sensed first by the system and from the most significant bit to the least significant bit of the key signal.

In the embodiment to be described, certain delay line storage elements are provided by a magnetic tape storage component, which may be the equivalent of a computer magnetic tape input/output device; and this component accepts records at the rates normally associated with magnetic tapes. Therefore, a typical sorting system, constructed in accordance with the concepts of the particular embodiment of the invention to be described herein can accept data, for example, at approximately a 500 kilocycle serial bit rate, or at roughly a 70 kilocycle character rate, where a character is a standard magnetic tape seven-word bit.

As noted above, the records within the sorting system of the invention are composed of words of *n* binary bits each. As mentioned above, and as will be described in more detail subsequently, each such record includes a control field and a data field. Space is provided in the control field of each record for additional bits to be inserted and removed and which serve to control certain operations during the sorting process, as will be described.

As noted above, each record is fed into the sorting system of the invention in a serial manner with the aforesaid control field (containing a key signal) in front of the data field, and in a manner such that the most significant bit of the binary coded key signal in the control field is fed first into the sorting system, followed by the key signal binary bits of decreasing significance, and then followed by the data portion of the word.

It is well known that a most important function of any data processing system is its ability to sort the records into desired ascending or descending progressions. However, data sorting has long presented a serious problem in that difficulties have been encountered in the past in providing a system capable of performing the required sorting in a short time interval and without the concomitant requirement of excessively large storage facilities and excessively complicated control circuitry.

An important feature of the present invention is the provision of an improved sorting system whose storage facilities need be no greater than the minimum requirements to hold the actual records being sorted.

Another feature of the invention is the provision of such an improved sorting system which is conceived and constructed so that there is no limit to the actual number of records which can be handled by the system and successfully sorted thereby; this being achieved in a minimum of time and with a minimum of necessary operating components.

An object of the invention, therefore, is to provide an improved data processing sorting system which is capable of rapidly, accurately and efficiently sorting records into a desired ascending or descending sequence, on the basis of binary coded identifying key signals contained in the respective control fields of the records.

Another object of the invention is to provide such an improved sorting system which is capable of performing the abovementioned sorting operation with a minimum of components and with a minimum of storage requirements.

Yet another object of the invention is to provide such an improved sorting system which is flexible in nature in that it is capable of handling as many, or as few, records as desired for any particular sorting operation.

Another object of the invention is to provide such an improved sorting system which is constructed so that the input of records to the system can be interrupted at any time, and subsequently resumed.

A further object of the invention is to provide such an improved sorting system which is constructed so that there is no limitation in the number of records which can be successfully sorted by the system, and in which such a sort can be achieved with a minimum of components.

Other objects and advantages of the invention will become apparent from a consideration of the following description, when the description is taken in conjunction with the accompanying drawings, in which:

FIGURE 4 is a logic block diagram of a sorting module which may be utilized, in conjunction with a multiplicity of similar modules, in the sorting network of FIGURE 3;

FIGURE 5 is a fragmentary logic block diagram representing a simplification of the system of FIGURE 1.

As mentioned above, in the operation of the system of the invention, the records to be sorted are serially introduced into the system, with the control field in front, and in a serial sequence, such that the key signal in the control field of each successive record is read from its most significant bit to its least significant bit.

The sorting operation commences the moment the first record is introduced into the system, and that record is placed in a particular storage location in the system, until it is displaced by a subsequent record having, for example, a higher or lower key number depending upon whether an ascending or descending sequence is desired. Then, as subsequent records are serially fed into the sorting system of the invention, their respective key signals are compared and a partial sort is effectuated while the system is in its input mode.

When all the records to be sorted have been fed into the sorting system of the invention, the system is set to successive sort modes, as will be described, until all the records are completely sorted. The system is then placed in a circulate mode to hold the records in storage until needed. Finally, the system is placed in an "output"

mode during which the records are successively presented at the output terminals of the system in a sorted sequence.

Figure 1:
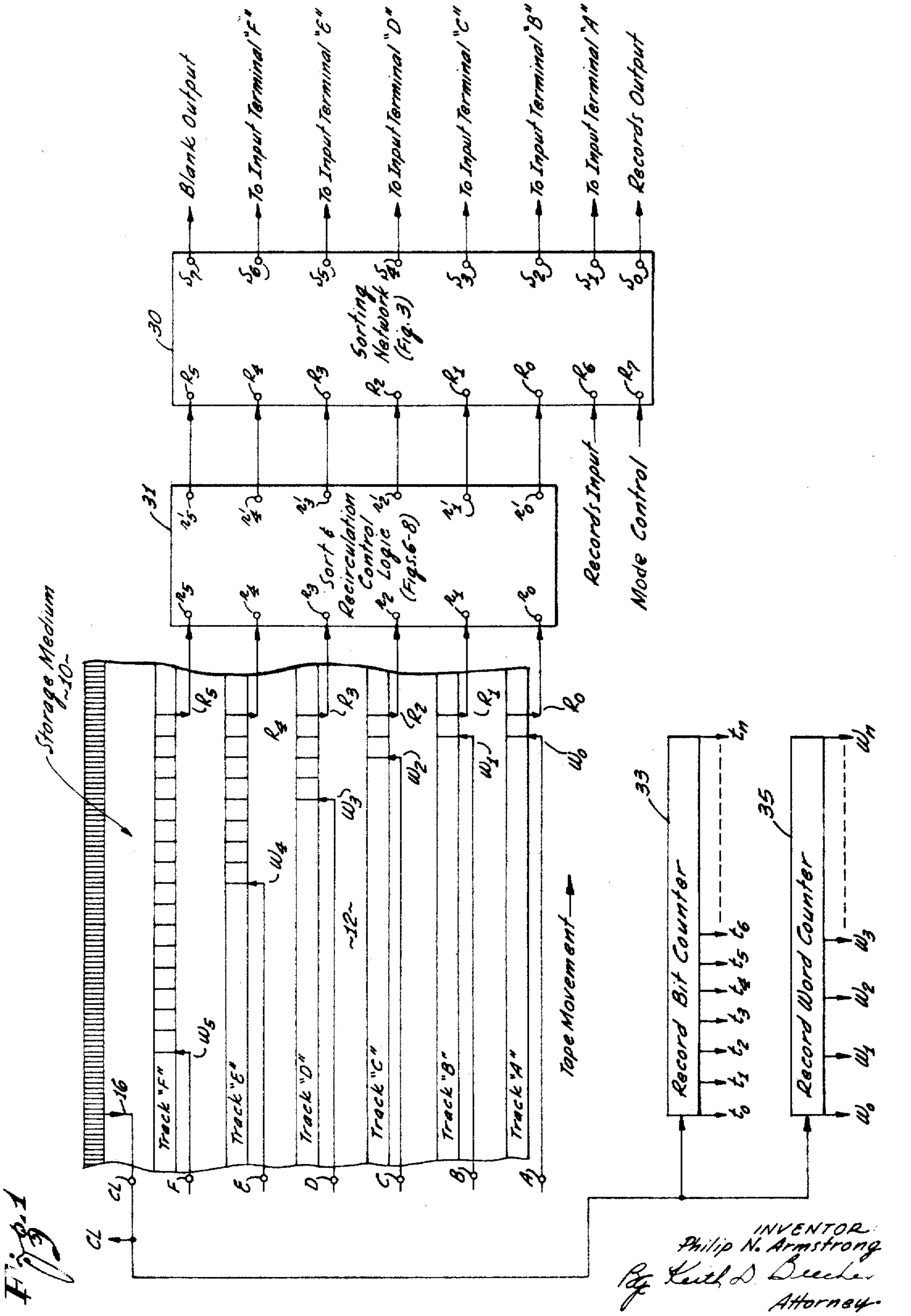
FIGURE 1 is a schematic block diagram of a system representing one embodiment of the present invention.

The sorting system of FIGURE 1 includes a storage medium 10. This storage medium may include, for example, a magnetic memory drum, or memory tape, on which different tracks or channels are provided to form registers for the different record words fed into the system. The storage medium may alternatively, for example, be made up of a plurality of delay lines having different lengths corresponding to the different numbers of record words to be respectively stored therein.

The storage medium 10, for purposes of explanation, may be considered to be in the form of a magnetic tape 12. A fragment of the tape is illustrated in FIGURE 1. The tape is assumed to be moving to the right in FIGURE 1. The tape includes a plurality of different channels, or tracks, which extend along its length. Corresponding read and write electro-magnetic transducer heads are provided for recording information in the different tracks, and for subsequently reading the information recorded in the tracks. These read and write heads are designated by arrows in FIGURE 1.

The magnetic tape 12 may also include a timing track which has regularly spaced magnetic recordings, these being used for clocking purposes. A transducer read head 16 is magnetically, or otherwise coupled to the timing track, and it responds to the recordings on the track to provide clock signals CL at its output. These clock signals represent the bit times in each of the successive record words circulating in the sorting system.

The clock signals CL are also used to synchronize the operation of a record bit counter 33 and of a record word counter 35. The bit counter produces timing signals $t_0$, $t_1$, $t_2$ . . . representative of the different bit times in each record; and the word counter produces timing signals $W_0$, $W_1$, $W_2$ . . . designating the different word times.

The magnetic tape 12 includes a track designated A, and this track forms the first storage register for the system. A write head $w_0$ is magnetically coupled to the track A, and this head responds to signals applied to the input terminal A to record such signal in that track. A read head $R_0$ is also magnetically coupled to the track A, and the read head is displaced from the write head along the track a distance corresponding to one record word.

A track B is also provided on the magnetic tape 12, and an appropriate write head $w_1$ and read head $R_1$ are magnetically coupled to the track B. The write head $w_1$ responds to signals applied to the input terminal B to record the corresponding magnetic signals on the track B. The read head $R_1$ is displaced along the track B a distance corresponding to one record word from the write head $w_1$.

The magnetic tape 12 also includes a track designated C. A write head $w_2$ and a read head $R_2$ are magnetically coupled to the track C. The read head $R_2$ is displaced along the track C a distance corresponding to two record words. The write head $w_2$ responds to input signals introduced to the input terminal C to produce corresponding recordings in the track C.

The tape 12 also includes a track D, a write head $w_3$ and a read head $R_3$ which are magnetically coupled to the track D. The write head $w_3$ responds to electric signals applied to the terminal D to produce corresponding recordings in the track D. The read head $R_3$ is displaced along the track D a distance corresponding, for example, to four record words.

The magnetic tape 12 also includes a track E. A write head $w_4$ and a read head $R_4$ are magnetically coupled to the track E. The write head responds to signals received from a terminal E to record corresponding signals in the track E. The read head $R_4$ is displaced along the track E a distance corresponding to eight record words.

The tape also includes a track F. A write head $w_5$ and a read head $R_5$ are magnetically coupled to the track F. The write head $w_5$ receives signals from a terminal F. The read head $R_5$ is displaced from the write head $w_5$ a distance corresponding to sixteen record words.

It is to be understood that the number of tracks shown on the magnetic tape 12 in FIGURE 1 is for purposes of illustration only. More or less tracks may be included, if so desired, depending upon the maximum number of record words to be sorted in the system. In each instance, each succeeding track will provide storage for an increasing number of record words in accordance with the progression $2^5$, $2^6$, $2^7$, $2^8$ . . .

The read heads $R_0$–$R_5$ are connected to correspondingly indicated input terminals of a sorting network 30 through appropriate control logic designated by a block 31. The block 31 is shown to have input terminals $r_0$–$r_5$ and corresponding output terminals $r'_0$–$r_5$. The control logic will be described in detail subsequently. The sorting network 30 may have any appropriate configuration, and a suitable form for the network will be described in conjunction with FIGURE 3. The sorting network examines the numbers represented by the key signals in the control fields of the different record words, and causes the records to appear at the output terminals of the sorting network in an ascending or descending sequence, depending upon the numbers represented by the key signals.

The input records which are to be sorted by the system of the invention may be stored in any suitable register, not shown, and these records are fed in a serial bit-by-bit manner to the input terminal $R_6$ of the sorting network, with the key signal control field first, and with the key signal arranged to be read from its most insignificant to its least significant bit. During the input mode of the system, and as will be described, blank words are also applied to the sorting network 30 from an appropriate source, these latter words being applied to an input terminal $R_7$.

Figure 2A:
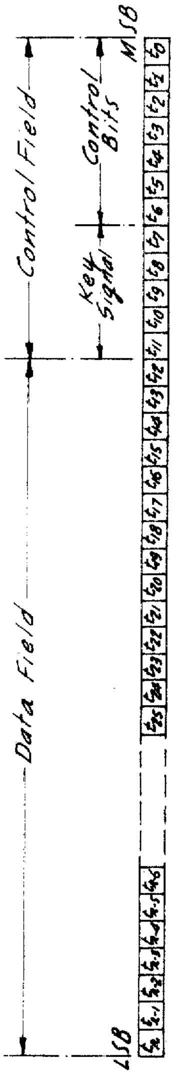
FIGURE 2A is a schematic representation of a record word of a composition suitable to permit sorting in the system of FIGURE 1.

As mentioned above, each record word, as shown in FIGURE 2A, consists, for example, of a multi-bit binary number. Each record word includes, as shown in FIGURE 2A, a data field in which the data is represented by a multi-bit binary number which may have, for example, as many as 500 bits. The control field of the record word, as shown in FIGURE 2A, includes a multi-bit key signal identifying the particular data word. In the illustrated example the key signals extends from $t_7$ to $t_{11}$ bit times in the record word. The control field also includes spaces for additional control bits, these control bits being introduced or removed during the sorting process, as will be described. The control bits may be inserted as binary ones in the spaces corresponding to the $t_0$–$t_6$ bit times of the record word, such spaces normally representing binary zeros. The data of the record word occupies the spaces corresponding to $t_{12}$–$t_n$ bit times of the word.

Figure 2B:
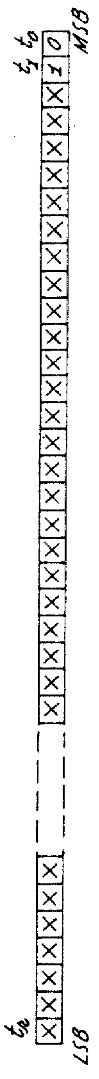
FIGURE 2B is a representation of a "blank" word used in the system to be described.

The "blank" word, as shown in FIGURE 2B, includes a unity binary bit in the $t_1$ position, and it normally includes a zero binary bit in its $t_0$ bit position. This means that the blank is greater than any record in the sorting system.

The sorting network 30 responds to the key signal of each record, as the particular record is read into the network 30 through the terminal $R_6$. The network 30 compares the key signal with the key signals of other records already in the system, as will be described. The reading of the records into the system is synchronized by the clock signals CL derived from the timing track of the magnetic tape, as mentioned above.

The sorting network 30 has eight output terminals. The output terminals are designated $S_0$–$S_7$. The record words introduced to the sorting network 30 at the input terminals $R_0$–$R_7$ are sorted in the network, and they appear in the particular embodiment, in an increasing sequence from the output terminal $S_0$ to the output terminal $S_6$. The output terminals $S_1$–$S_6$ are connected back to the respective input terminals A, B, C, D, E, and F of the storage medium 10. The sorted data appears at the record output terminal $S_0$ during the output mode of the system. The blanks appear at the output terminal $S_7$ and are not used.

Figure 3:
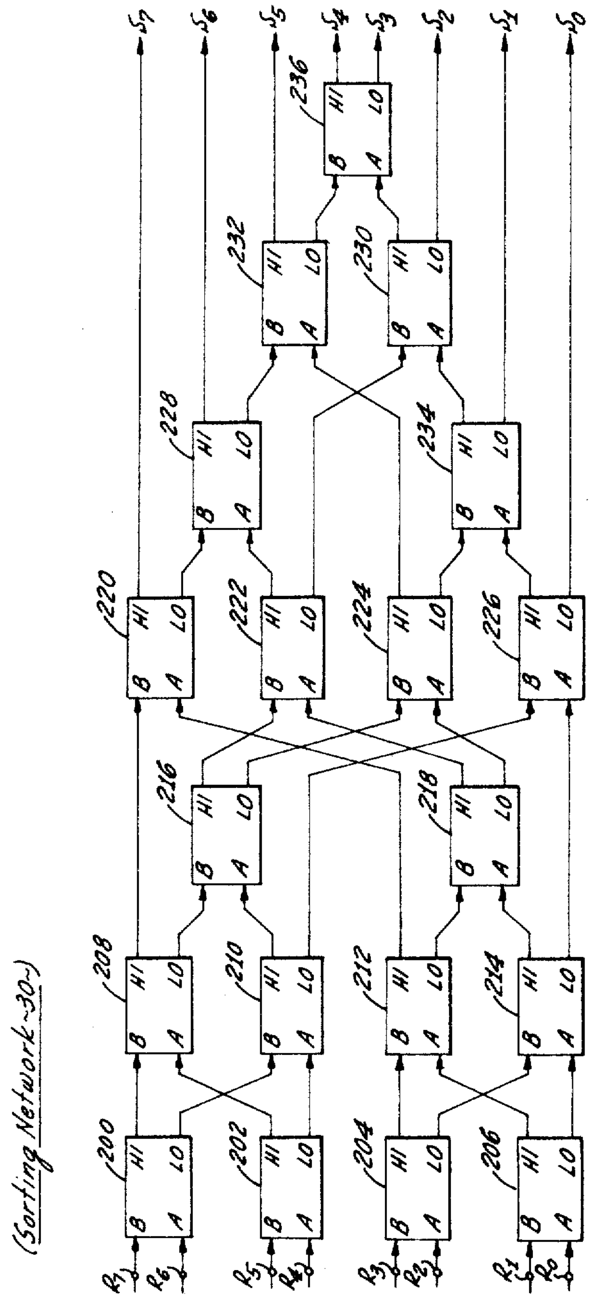
FIGURE 3 is a block diagram of a sorting network which may be used in the system of FIGURE 1.

The sorting network 30 of FIGURE 1 may take the form shown in the block diagram of FIGURE 3. Each of the blocks in FIGURE 3 is a sorting module, and these modules may each take the form of a logic sorting system, such as shown in FIGURE 4. The input terminals of each of the blocks in FIGURE 3 are designated A and B, and the output terminals are designated "Lo" and "Hi."

In the illustrated embodiment of FIGURE 3, the input terminals $R_6$ and $R_7$ of the sorting network 30 are respectively connected to the input terminals A and B of a modular block 200. Likewise, the input terminals $R_4$ and $R_5$ of the sorting network 30 are connected to respective input terminals A and B of a modular block 202; the input terminals $R_2$ and $R_3$ of the sorting network are connected respectively to the input terminals A and B of a modular block 204; and the input terminals $R_0$ and $R_1$ are connected to the respective input terminals A and B of a modular block 206.

The output terminal Hi of the block 200 is connected to the input terminal B of a block 208, and the output terminal Lo of the block 200 is connected to the input terminal B of a block 210. The output terminal Hi of the block 202 is connected to the input terminal A of the block 208; and the output terminal Lo of the block 202 is connected to the input terminal A of the block 200.

The output terminal Hi of the block 204 is connected to the input terminal B of a block 212, and the output terminal Lo of the block 204 is connected to the input terminal B of a block 214. The output terminal Lo of the block 204 is connected to the input terminal B of the block 214, and the output terminal Hi of the block 206 is connected to the input terminal A of the block 212.

The output terminal Lo of the block 208 is connected to the input terminal B of a block 216, and the output terminal Hi of the block 210 is connected to the input terminal A of the block 216. The output terminal Lo of the block 212 is connected to the input terminal B of a block 218, and the output terminal Hi of the block 214 is connected to the input terminal A of the block 218.

The output terminal Hi of the block 212 is connected to the input terminal A of a block 220, and the output terminal Hi of the block 208 is connected to the input terminal B of the block 220. The output terminal Hi of the block 216 is connected to the input terminal B of a block 222, and the output terminal Lo of the block 216 is connected to the input terminal B of a block 224. The output terminal Hi of the block 218 is connected to the input terminal A of the block 222, and the output terminal Lo of the block 218 is connected to the input terminal A of the block 224. The output terminal Lo of the block 210 is connected to the input terminal B of a block 226, and the output terminal Lo of the block 214 is connected to the input terminal A of the block 226.

The output terminal Hi of the block 220 is connected to the output terminal $S_7$ of the sorting network 30, and the output terminal Lo of the block 220 is connected to the input terminal B of a block 228. The output terminal Lo of the block 222 is connected to the input terminal B of a block 230. The output terminal Hi of the block 224 is connected to the input terminal A of a block 232, and the output terminal Lo of the block 224 is connected to the input terminal B of a block 234.

The output terminal Hi of the block 228 is connected to the output terminal $S_6$ of the sorting network 30, and the output terminal Hi of the block 232 is connected to the output terminal $S_5$ of the sorting network. The output terminal Lo of the block 232 is connected to the input terminal B of a block 236, and the output terminal Hi of the block 230 is connected to the input terminal A of the block 236.

The output terminal Hi of the block 236 is connected to the output terminal $S_4$ of the sorting network, and the output terminal Lo of the block 236 is connected to the output terminal $S_3$ of the sorting network. The output terminal Lo of the block 230 is connected to the output terminal $S_2$ of the sorting network 30, the output terminal Lo of the block 234 is connected to the output terminal $S_1$ of the sorting network, and the output terminal Lo of the block 226 is connected to the output terminal $S_0$ of the sorting network.

From the above described connections of the modular blocks in the sorting network 30 of FIGURE 3, it will be appreciated that the higher of the two signals compared in the block 200 is applied to the block 208, where the lower of the two signals is applied to the block 210. Likewise, the higher of the two signals compared in the block 202 is applied to the block 208, whereas the lower of the two is applied to the block 210.

In like manner, the records compared in the different modules of the sorting network 30 in FIGURE 3 are shifted up and down between the modules until they appear in a sorted condition at the output terminal $S_0$–$S_7$. As mentioned above, the records appearing at the output terminals $S_0$–$S_7$ appear sorted in an ascending sequence in the particular embodiment under consideration.

Each of the modules of the sorting network of FIGURE 3 may be composed, as noted, of a logical system such as shown in FIGURE 4. The system of FIGURE 4 is constructed so that when two records are introduced respectively to the input terminals A and B in a serial bit-by-bit manner, the illustrated system compares the key signals of the two records and sorts the records on the basis of their key signals. The record with the higher key signal appears at the output terminal Hi, and the record with the lower number key signal appears at the output terminal Lo.

As mentioned previously, the key signal comparison proceeds in the system of FIGURE 4 from the most significant bit of each of the key signals to the least significant bit. Once the comparison of a particular bit of one of the key signals with a corresponding bit of the other key signal indicates that one of the bits is a "1" while the other is a "0," the decision is made, and the selection of the output terminals for the two record words is determined.

That is, the comparisons made thereafter between the bits in the remaining portions of the key signals, and in the bits in the data fields, have no effect on the selection of the output terminals for the two records, as the selection has already been made.

This is proper because the comparison, as indicated, proceeds from the most significant bit to the least significant. In either key signal, the first key signal to contain a binary "1" at a particular position, when the other key signal contains a binary "0," immediately indicates that the record having the first key signal is the higher.

The sorting system of FIGURE 4 is constructed so that the records A and B applied to the correspondingly identified input terminals A and B are gated through first and second "and" gates and through a first "or" gate to the Hi output terminal; whereas, the complements of the records A and B (namely, $\overline{A}$ and $\overline{B}$) are gated through third and fourth "and" gates and through a second "or" gate and through an inverter network to the Lo output terminal. The passage of these records through the "and" gates is controlled by an inhibit flip-flop $Q_1$ and by an exchange flip-flop $Q_3$, as will be described.

The applied records A and B pass through all the "and" gates of the system of FIGURE 4, so long as each successive bit of both records is the same, each being either a "1" or a "0." So long as this condition continues, the successive bits of the two records appear simultaneously at the Hi and Lo output terminals.

However, when a condition ocurs such that one of the bits of one of the records is a binary "0" when the corresponding bit of the other record is a binary "1," the sorting system of FIGURE 4 is controlled so that thereafter all the bits of the former appear at the Lo output terminal, and all the bits of the latter signal appear at the Hi output terminal, regardless of the relationship between these latter bits of the two record words.

It is apparent, therefore, that if the two records A and B are inroduced to the sorting system of FIGURE 4 in a serial bit-by-bit manner; and with the control field of each in front so that each key signal may be read from its most significant to its least significant bit, the sorting system will cause the higher record to appear at the output terminal Hi and the lower record to appear at the output terminal Lo.

The sorting system of FIGURE 4 includes a first input terminal A which receives, for example, the first record A; and it includes a second input terminal B which receives, for example, the second record B. The input terminal A is connected to an "and" gate 312 and to an inverter network 319. The input terminal B is connected to an "and" gate 313 and to an inverter network 320. The inverter network 319 responds in known manner to the input record A to produce its complement $\overline{A}$ on a bit-by-bit basis; and the inverter network 320 responds to the record B to produce its complement $\overline{B}$ on a bit-by-bit basis.

The inverter network 319 is connected to an "and" gate 321, and the inverter network 320 is connected to an "and" gate 322. The "and" gates 312 and 313 are connected to an "or" gate 314. The "or" gate 314 is connected to the output terminal designated Hi. The "and" gates 321 and 322 are connected to an "or" gate 323. The "or" gate 323 is connected to an inverter network 325 which, in turn, is connected to the Lo output terminal.

The input terminal A and the output of the inverter network 320 are connected to an "and" gate 335. This means that the binary coded records A and $\overline{B}$ are introduced to the "and" gate 335. The input terminal B and the output of the inverter network 319 are connected to an "and" gate 337. Therefore, the binary coded record words B and $\overline{A}$ are applied to the "and" gate 337. Appropriate bit timing clock pulses derived from the storage medium 12, in the manner described above, are also applied to the "and" gates 335 and 337 for bit timing purposes.

The "and" gate 335 is connected to the set input terminal of the inhibit flip-flop $Q_1$. The "and" gate 337 is connected to the set input terminal of the exchange flip-flop $Q_3$. Prior to each input operation, reset pulses are applied to the input terminals of the flip-flops $Q_1$ and $Q_3$ to reset the flip-flops.

The false output terminal $\overline{Q}_1$ of the inhibit flip-flop $Q_1$ is connected to the "and" gates 313 and 321, and also to the "and" gate 337. This false output terminal $\overline{Q}_1$ of the flip-flop applies the term $\overline{Q}_1$ to the "and" gates 313, 321 and 337. The false output terminal $\overline{Q}_3$ of the exchange flip-flop $Q_3$ is connected to the "and" gates 312 and 322, and to the "and" gate 335. This output terminal of the exchange flip-flop applies the term $\overline{Q}_3$ to the "and" gates 312, 322 and 335.

As noted above, in order for the system of FIGURE 4 to perform its sorting function, it is necessary for the records A and B to be applied to the sorting system in a bit-by-bit serial manner, and with the most significant bit of the key signal in each of their control fields in the lead.

At the commencement of the sorting operation, both the inhibit flip-flop $Q_1$ and the exchange flip-flop $Q_3$ are reset, so that both the terms $\overline{Q}_1$ and $\overline{Q}_3$ are false.

Therefore, at the beginning of the operation, the "and" gates 312, 313, 321 and 322 are all enabled. The records A and B pass through the "and" gates on a serial bit-by-bit basis, so long as the corresponding bits of the two records are both either "1" or "0." These bits then appear unchanged, at the output terminals "Hi" and "Lo."

Assume now that a bit of the key signal of the record A is "0" at the time when the corresponding bit of the key signal of record B is a "1," and that this is the first instance that such a condition has occurred. This means that the key signal of the record B represents a higher number than the key signal of the record A. Under this condition, the term $\overline{A}.B$ is true so that the "and" gate 337 is enabled. The next clock pulse CL sets the exchange flip-flop $Q_3$, so that the "and" gates 312 and 322 are disabled. Also, the "and" gate 335 is disabled, so that no further triggering of either of the flip-flops $Q_1$ or $Q_3$ is possible during the particular comparison operation.

Following the detection of a zero bit in the key signal of the A record, and the simultaneous detection of a one bit in the key signal of the B record, indicating that the B record is greater than the A record, the remaining bits of the control and data fields of the A record pass through the enabled "and" gate 321 in a complemented $\overline{A}$ form, and through the "or" gate 323 and the inverter network 325 to the output terminal Lo.

The corresponding bits of the remaining portions of the key signal and in the data field of the B record pass through the enabled "and" gate 313 and through the "or" gate 314 to the output terminal Hi. Therefore, the detection of inequality between the key signals in the control fields of the A and B records causes the A record (the lower of the two) to appear at the output terminal Lo, and causes the B record (the higher of the two) to appear at the output terminal Hi.

Conversely, should the comparison described above reach a point at which the key signal of the A record has a "1" binary at the time when the key signal of the B record has a "0" binary bit, indicating that the A record is greater than the B record, the term $A.\overline{B}$ is applied to the "and" gate 335 and enables the "and" gate 335, so that the next clock pulse sets the inhibit flip-flop $Q_1$.

This setting of the inhibit flip-flop $Q_1$ causes the "and" gates 313 and 321 to become disabled, and also causes the "and" gate 337 to become disabled. The disabling of the "and" gate 337 prevents any setting of the exchange flip-flop $Q_3$ during the remaining portion of the comparison process for the particular records under consideration.

Under the latter set of conditions, the greater record A is passed through the "and" gate 312 and through the "or" gate 314 to the Hi output terminal, whereas the lower record word B is passed through the inverter 320, through the "and" gate 322, and through the "or" gate 323 to the inverter 325. This latter record B is reinverted in the inverter 325, and it appears at the Lo output terminal in its original form.

A material saving in the number of sorting modules required in the sorting system 30 of FIGURE 1 can be realized by using the system shown in FIGURE 5. In the latter system, the sorting network 30 is replaced by a sorting network **30*a*. The sorting network 30*a* may be similar to the sorting system 30, except that it includes, for example, six input terminals and six output terminals (instead of eight), with a resulting material saving in modules. The system of FIGURE 5 includes a further sorting module 30*b* and a further module 30*c***. These further sorting modules may be similar to the type described above in conjunction with FIGURE 4.

The blank input is applied to the input terminal A of the sorting module **30*b*, and the $r'_0$ output terminal of the block 31 is connected to the input terminal B of that module. The output terminal Hi of the sorting module 30*b* is connected to the input terminal $R_0$ of the sorting network 30$a$, whereas the output terminal Lo of the sorting module 30**$b$ is connected to the data output terminal $S_0$.

The output terminal $r'_5$ of the block 31, on the other hand, is connected to the input terminal A of the module 30$c$, whereas the records input is applied to the input terminal B. The output terminal Lo of the sorting module 30$c$ is connected to the input terminal $R_5$ of the sorting network 30$a$, whereas the output terminal Hi of the module 30$c$ is connected to the blanks output terminal $S_7$.

The system of FIGURE 5 operates in a manner similar to the sorting network 30 described above. However, the pair of additional sorting modules 30$b$ and 30$c$ replace a plurality of like modules, previously required in the sorting network 30.

Figure 6:
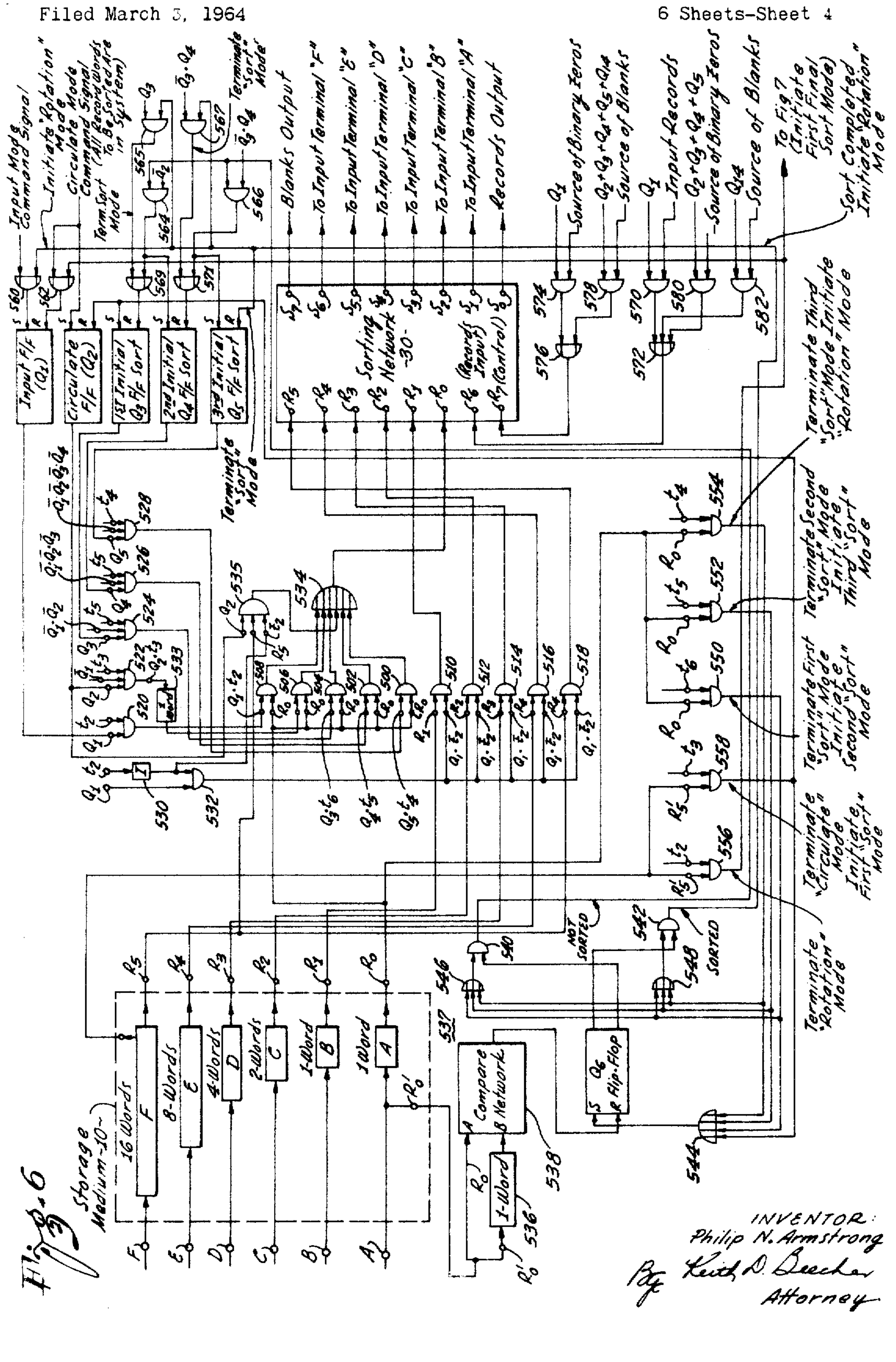
FIGURES 6, 7 and 8 are logic control systems used in the sorter system of FIGURE 1.

Appropriate logic for the block 31 of FIGURE 1, insofar as the input and initial sorting modes of the system are concerned, is shown in FIGURE 6. In the logic system of FIGURE 6, the read head $R_0$ of the storage medium 10 is connected to a plurality of "and" gates 500, 502, 504, 506 and 508. The read heads $R_1$–$R_5$ of the storage medium 10 are respectively connected to corresponding "and" gates 510, 512, 514, 516 and 518.

The logic system of FIGURE 6 includes a plurality of flip-flops designated $Q_1$, $Q_2$, $Q_3$, $Q_4$ and $Q_5$. The flip-flop $Q_1$ is the input flip-flop, and it is set at the beginning of the input mode during which the records to be sorted are fed into the system. This flip-flop $Q_1$ is reset at the end of the input mode. Directly following the input mode, the system undergoes a circulate mode, as will be described. The flip-flop $Q_2$ is the circulate flip-flop, and this flip-flop is set at the beginning of the circulate mode and reset at the end of the circulate mode.

After the circulate mode, the sorting system of the invention undergoes a succession of initial sort modes; these initial sort modes being continued until the higher half of the records in the sorting system are completely sorted. For purposes of explanation, the sorting system logic of FIGURE 6 is considered to be capable of providing three successive sort modes, each under the control of different ones of the flip-flops $Q_3$, $Q_4$ and $Q_5$.

The set output terminals of the flip-flops $Q_1$, $Q_2$, $Q_3$, $Q_4$ and $Q_5$ are connected to respective "and" gates 520, 522, 524, 526 and 528. In addition, the term $\overline{Q}_1$ is introduced to the "and" gate 522, and the term $\overline{Q}_1 \cdot \overline{Q}_2$ is introduced to the "and" gate 524, the term $\overline{Q}_1 \cdot \overline{Q}_2 \cdot \overline{Q}_3$ is introduced to the "and" gate 526, and the term $\overline{Q}_1 \cdot \overline{Q}_2 \cdot \overline{Q}_3 \cdot \overline{Q}_4$ is introduced to the "and" gate 528. The bit timing pulses $t_2$, $t_3$, $t_6$, $t_5$ and $t_4$ also are introduced respectively to the "and" gates 520, 522, 524, 526 and 528.

The aforesaid "and" gates 520, 522, 524, 526 and 528 are connected respectively to the "and" gates 508, 506, 504, 502 and 500. The bit timing pulses $t_2$ are also applied through an inverter 530 to an "and" gate 532. The term $Q_1$ is also applied to the "and" gate 532. The output $Q_1 \cdot \overline{t}_2$ from the "and" gate 532 is applied to the "and" gates 510, 512, 514, 516 and 518. A one-word delay register 533 is interposed between the gates 522 and 506.

The "and" gates 500, 502, 504, 506 and 508 are all connected to an "or" gate 534, the output of which is applied to the input terminal $R_0$ of the sorting network 30. The "and" gates 510, 512, 514, 516 and 518 are connected respectively to the input terminals $R_1$–$R_5$ of the sorting network 30. An "and" gate 535 is also connected to the "or" gate 534. The output from the read head $R_5$ is applied to the "and" gate 535, as are the term $Q_2$ and the bit timing signal $t_2$.

The input ($R'_0$) to the one word register A is applied to a sort detection network 537 which determines whether the successive records passing out of the one word register A are sorted or not. This latter network includes a one word register 536. The input ($R'_0$) to the register A is applied to the one word register 536 and to a compare network 538 of known construction, the output from the register 536 also being applied to the compare network. The compare network produces an output only when the record applied to its input terminal B is greater (for example) than the record applied to its input terminal A.

The output terminal of the compare network 538 is connected to the reset input terminal of a flip-flop $Q_6$. The reset output terminal of the flip-flop $Q_6$ is connected to an "and" gate 540, and the set output terminal of the flip-flop is connected to an "and" gate 542. The "and" gate 542 is connected to a pair of "and" gates 565 and 567. The term $Q_3$ is applied to the "and" gate 565 and the term $\overline{Q}_3 \cdot \overline{Q}_4$ is applied to the "and" gate 567. The "and" gate 565 is connected to an "or" gate 569, and the "and" gate 567 is connected to an "or" gate 571. The "or" gated 569 and 571 are connected respectively to the reset input terminals of the flip-flops $Q_3$ and $Q_4$.

The aforementioned sort detection network 537 also includes an "or" gate 544 connected to the set input terminal of the flip-flop $Q_6$, and an "or" gate 546 connected to the "and" gate 540. The network also includes an "or" gate 548 connected to the "and" gate 542. In a manner to be described, an output from the "and" gate 540 designates that the record words of a particular circulation are not in a completely sorted condition, whereas an output from the "and" gate 542 indicates that the records are in a sorted condition.

The output from the read head $R_0$ of the storage medium 10 is also applied to each of a plurality of "and" gates 550, 552, and 554. The bit timing pulses $t_6$, $t_5$ and $t_4$ are also respectively applied to these "and" gates. Likewise, an output ($R'_5$) from the 16-word register F is applied to each of a pair of "and" gates 556 and 558. This output precedes the output from the read head $R_5$ by one word time. The bit timing signals $t_2$ and $t_3$ are also respectively applied to these "and" gates. The "and" gates 558, 550, 552 and 554 are connected to the "or" gate 544. The "and" gates 550, 552 and 554 are each connected to the "or" gates 546 and 548.

The output from the "and" gate 540 is applied to a pair of "and" gates 564 and 566. The "and" gate 564 is connected to the "or" gate 569 and to the set input terminal of the second sort flip-flop $Q_4$. The "and" gate 566, on the other hand, is connected to the "or" gate 571 and to the set input terminal of the third sort flip-flop $Q_5$. The terms $\overline{Q_2}$ and $\overline{Q_3}$ are respectively introduced to the "and" gates 564 and 566.

The output from the "and" gate 540 is applied through the "or" gate 560 to the set input terminal of the input flip-flop $Q_1$, the flip-flop $Q_1$ being used additionally during a "rotation" mode of operation. Finally, the output from the "and" gate 556 is applied through the "or" gate 562 to the reset input terminal of the input flip-flop $Q_1$, and the output from the "and" gate 558 is applied to the reset input terminal of the flip-flop $Q_2$ and to the set input terminal of the flip-flop $Q_3$.

The input command signal, derived for example from an associated computer, or the like, is introduced through an "or" gate 560 to the set input terminal of the input flip-flop $Q_1$. This command signal is received, the instant the first record is in position to be fed serially into the sorting system, and it sets the system to the input mode.

After any desired number of records to be sorted have been fed into the system, a circulate mode command signal is applied to the set input terminal of the circulate flip-flop $Q_2$, and through an "or" gate 562 to the reset input terminal of the flip-flop $Q_1$. This latter command signal terminates the input mode of operation of the system, and sets the system to the circulate mode.

During the input mode, the input flip-flop $Q_1$ is set, as mentioned above, and the records are fed into the system by way of the input terminal $R_6$ of the sorting network 30 (through "and" gate 570 and "or" gate 572). As mentioned above, the records are so fed into the system on a serial bit-by-bit basis, with the key signal in front and in a manner such that the sensing by the sorting system is from the most significant to the least significant bit of each word.

During the input operation, a series of binary zeros are applied to the control input terminal $R_7$ of the sorting network 30 (FIGURE 1) through "and" gate 574 and "or" gate 576. Prior to the introduction of the records into the sorting system, the system is filled with "blank" words (FIGURE 2B) so that all the registers in the storage medium 10 have "blank" words circulating therein. These blank words, as mentioned above, represent normally the highest value any record in the system can achieve.

Since, during the input operation, the control bits applied to the input terminal $R_7$ take the form of a series of binary zeros, the resulting words represent the lowest value which can be achieved in the system. These control bits, therefore, will always appear at the minimum output terminal $S_0$ of the sorting network 30 during the input operation. Therefore, so long as binary "0's" are applied to the input terminal $R_7$, none of the records can escape from the system, since only the binary "0's" appear at the minimum output terminal $S_0$. Since "blank" words are initially loaded into the sorting system, the various records serially applied to the input terminal $R_6$ of the sorting network 30 during the input mode of the system will appear in a sorted condition at the output terminals $S_1$–$S_6$ and these will cause the blanks to be displaced out the terminal $S_7$.

It will be appreciated that since the "blank" words represent the highest value which can be achieved in the sorting system, so long as any blank words remain in the system, these only will appear at the output terminal $S_7$, and no records will be lost through that output terminal.

Since the system is originally loaded with "blank" words, the first record to be fed into the system during the input mode will appear at the output terminal $S_1$ of the sorting network 30, so as to be loaded into the one word register A of the storage medium 10. Then, when the second record is fed into the system, the previous record passes out of the one-word register A and through the "and" gate 508 to the input terminal $R_0$ of the sorting network. In its passage through the "and" gate 508, it receives a unity control bit at its $t_2$ bit position (see FIGURE 2). Since all the records fed into the system normally have zero bits in the control bit positions, it follows that the original record from the A register is now the greatest of any record that might be introduced into the system.

Therefore, for the next comparison, the first record moves up to the register B, and the new record moves into the register A. For the next comparison, the original record from the register B loses its $t_2$ control bit, as it passes through the "and" gate 510 on its way to the $R_1$ input terminal of the sorting network 30, whereas the second record receives the $t_2$ control bit, as it passes through the "and" gate 508 on its way to the $R_0$ input terminal of the sorting network.

During the next comparison, the second record is the greatest of all the records, but is, of course, less than the blank words. Therefore, the second record is now placed in the two-word register C; whereas the other two records are placed in the one-word registers A and B, the selection depending upon which is the greater. During these operations, blank words are being displaced out the output terminal $S_7$.

The input operation continues, with each of the records coming out of the A register receiving a control bit $t_2$ to make it the greatest of the records being sorted at any particular time, and to assure that it will be placed in the greatest position in the register unoccupied by blanks. Likewise, the action of the "and" gates 510, 512, 514, 516, and 518 causes each record coming out of the other registers to lose its $t_2$ control bit, prior to being applied to the input terminals of the sorting network 30.

The above described action continues until the command signal from the computer indicates the end of the inputting of the records to be sorted, this latter command signal resetting the input flip-flop $Q_1$ and setting the circulate flip-flop $Q_2$. The system now immediately enters a circulate mode.

At the termination of the input mode, and assuming, for purposes of explanation, that thirty-two records have been fed into the system, many of the lower sixteen records will be in the longest register F. At the end of the input mode, the control bits on the control line $R_7$ are changed to blank words (through "and" gate 578), and a series of zero bits are applied to the input terminal $R_6$ (through "and" gate 580). The zero bits appear at the output terminal $S_0$, so that no records escape from that terminal. Likewise, the blank words appear at the output terminal $S_7$, so that no records escape from the system by way of that terminal.

At the beginning of the circulate mode, the circulate flip-flop $Q_2$ is set and the input flip-flop $Q_1$ is reset. This means that of the group of "and" gates 520, 522, 524, 526, 528 and 533, only the "and" gates 522 and 535 are enabled. The enabling of the "and" gate 522 causes the "and" gate 506 to be enabled one word time later, and this causes each record coming out of the one-word register A (after the first record) to have a unity control bit inserted in its $t_3$ bit position. Since the "and" gates 520 and 532 are now disabled, the $t_2$ bits are no longer added to the words circulating in the system.

During the circulate mode, the "and" gate 535 is enabled. This causes all the $t_2$ bits to be returned to the binary zero state, as the words are circulated out of the F register. This circulate mode is continued until the record which was in the one-word A register at the beginning of the mode has circulated all the way through all the registers and is about to emerge from the 16-word F register. When that occurs, the presence of a $t_3$ bit is detected by the "and" gate 558; and the resulting output from the "and" gate 558 resets the circulate flip-flop $Q_2$ to terminate the circulate mode, and it sets the flip-flop $Q_3$ to initiate the first initial sort mode. The output of the "and" gate 558 also is applied to the set input terminal of the flip-flop $Q_6$ through the "or" gate 544 to activate the sort detection network 537.

At the termination of the above-described circulate mode, the sixteen lower records are in the register F; and the sixteen higher records are in the other registers. All the $t_2$ bits have been returned to zero; and all the records in the register F contain $t_3$ control bits, and only those records contain the $t_3$ bits.

During the first initial sort mode, the "and" gate 524 is enabled, so that a unity bit may be introduced at the least significant control bit position $t_6$ of the records coming out of the one-word register A. This operation is continued until a circulation has been made, as evidenced by the first word out of the one-word register A with a $t_1$ control bit. The presence of such a record is detected by the "and" gate 550. During the initial sort modes, the lower records, which are disposed in sequence in the F register, are all protected by the $t_3$ control bits, so they merely circulate in the F register.

Now, if all the records circulating through the registers A–E of the system become sorted in the first sort circulation, it means that each record circulating is greater than the preceding record. Therefore, during the entire circulation of the first sort, under these conditions, each record applied to the input terminal A of the network is greater than the preceding record from the register 536, which is applied to the terminal B of the network 538, so that no output appears at the output terminal of the network 538. It will be remembered that the flip-flop $Q_6$ of the sort detection network 537 was set at the beginning of the circulation of the first initial sort circulation, and under these conditions, it remains set until the end of the circulation.

Then, the indication that the circulating words are all sorted, enables the "and" gate 542, so that the $t_6$ pulse at the end of the first sort, received from the "and" gate 550, is passed through the "or" gate 548, and through the "and" gate 542 and "or" gate 560 to the set input terminal of the input flip-flop $Q_1$; and the $t_5$ pulse is also passed through the "and' gate 565 and "or" gate 569 to the reset input terminal of the flip-flop $Q_2$. This action immediately terminates the initial sort mode of the system and sets the system to the "rotation" mode.

Under the above mentioned conditions we have the sixteen lower records (each bearing the unity $t_3$ control bits) in the register F, and the sixteen higher records in sequence in the registers A, B, C, D and E. Of the sixteen higher records, only the eight in the E register contain the $t_6$ control bit.

If the sort detection flip-flop $Q_6$ indicates that a sort has been completed in the first initial sort circulation, the resulting output applied to the "and" gate 565 passes through the "and" gate to reset the flip-flop $Q_3$. However, if during the aforementioned first sort circulation, one or more of the higher records are out of sequence, an output will appear at the output terminal of the compare network 538, and this output will reset the flip-flop $Q_6$ during the circulation. The resetting of the flip-flop $Q_6$ enables the "and" gate 540, so that the signal $t_6$ from the "and" gate 550 indicating the end of the first sort circulation causes a "not sorted" output signal to appear from the "and" gate 540.

This "not sorted" output signal is applied, at the end of the first initial sort circulation, through the "and" gate 546 to reset the flip-flop $Q_3$ and to set the flip-flop $Q_4$. The setting of the flip-flop $Q_4$ causes the system to enter into its second initial sort mode. During the second initial sort mode, all the words coming out of the A register have a $t_5$ control bit introduced, as they pass through the "and" gate 502. This continues until a circulation, after which the "and" gate 552 detects a $t_5$ control bit in the first record to reach the last position in the D register. During the second sort mode the records in the F register (protected by the $t_3$ bits) merely circulate, and the records in the E register (protected by the $t_6$ bits) also merely circulate.

Again, the flip-flop $Q_6$ of the sort detection circuit 537 is set at the beginning of the second initial sort circulation, and it remains set if all the words are established in a sorted condition during the record sort circulation. As in the previous sort circulation, should the sort detection flip-flop $Q_6$ remain set to the end of the second sort circulation, the input flip-flop $Q_1$ is set so as to establish the system in its rotation mode, and the second sort flip-flop $Q_4$ is reset.

However, if at the termination of the second initial sort circulation, the rceords are still not completely sorted, the resulting "not sorted" signal from the gate 540 causes the system immediately to enter into its third sort mode, in a manner similar to that described above, and by the setting of the flip-flop $Q_5$. During this latter sort mode, a $t_4$ control bit is introduced to the words coming out of the A register, this by means of the "and" gate 500.

With the number of registers illustrated in FIGURE 5, and under the worst possible conditions, the contents of the system will be completely sorted at the termination of the third sort circulation. At this time, an ouput is derived from the "sorted" "and" gate 542 of the sort detection network, so that the system is set to its "rotation" mode.

The initial sort circulations described above cause all the sixteen larger records in the registers A, B, C, D and E to become sorted. However, the sixteen lower records in the register F merely circulate in that register since each of these appearing at the output of the register F is identified by its $t_3$ control bit and is returned immediately to the input terminal of that register by the sorting network 30.

During the rotation mode, the input flip-flop $Q_1$ is again set, so that the $t_2$ control bits are again introduced to the records, as they come out of the A register. This is continued, until a control bit $t_2$ is detected in a record about to come out of the longest register F. This latter detection is carried out by the "and" gate 556. When that occurs, the output of the "and" gate 556 resets the input flip-flop $Q_1$ to terminate the rotation mode.

It is evident, therefore, that the rotation mode continues until the lower sixteen records (each identified by its $t_3$ control bit) are read out of the F register and distributed through the A, B, C, D and E registers; these being replaced by the higher sixteen records which, at the termination of the rotation, are each identified by a $t_2$ control bit. The sixteen higher records, now in the F register, appear in the F register in a sorted condition, by virtue of the previous initial sort modes described above. However, the sixteen lower records, which are now distributed through the A, B, C, D and E registers, are not necessarily all in a sorted condition. Therefore, at the termination of the rotation mode the system is caused to undergo a succession of final sort modes, during which the records in the A, B, C, D and E registers are all placed in the desired sorted ascending sequence.

Figure 7:
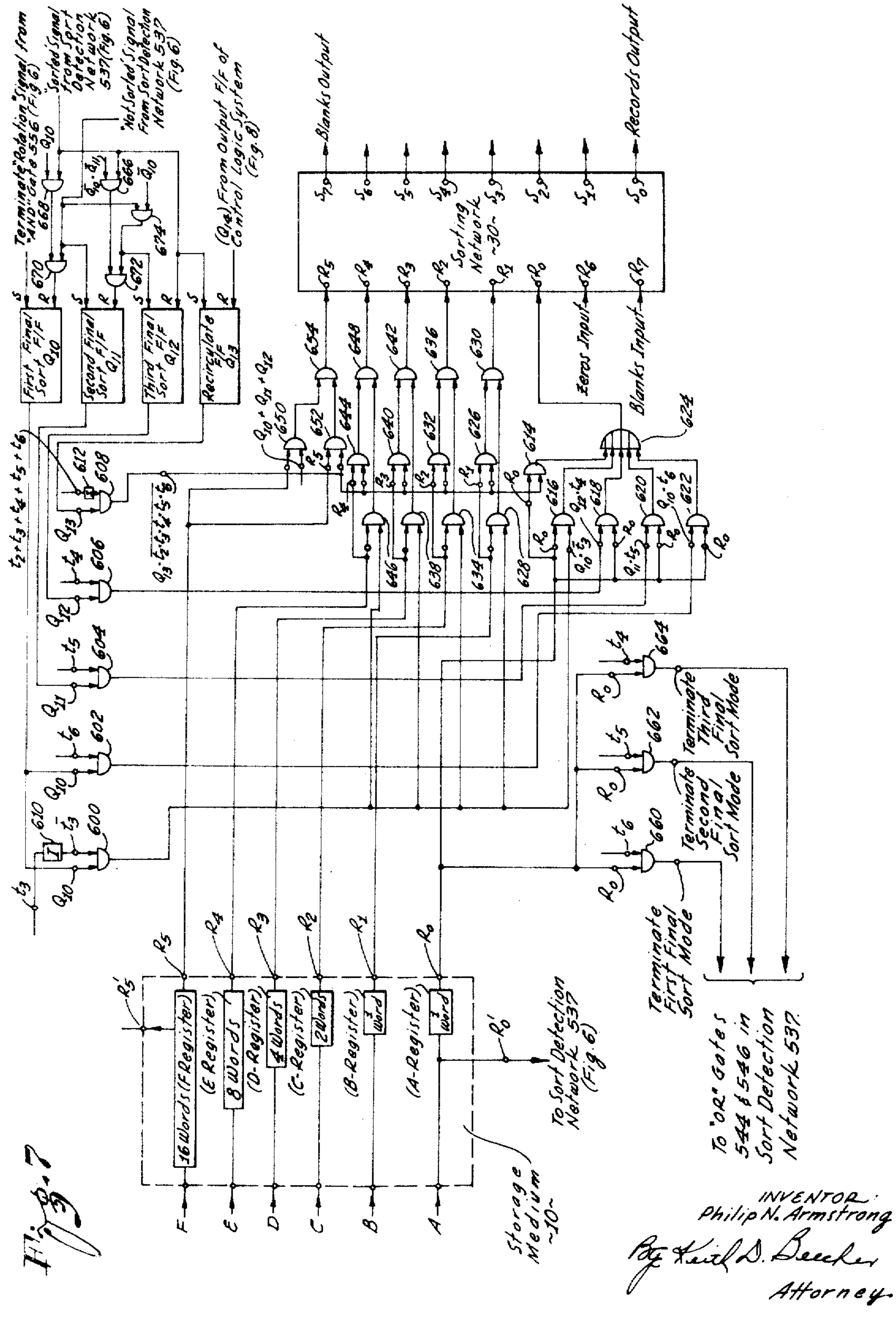

The logic for the final sort and recirculate modes is shown in FIGURE 7. This logic system includes a plurality of final sort flip-flops $Q_{10}$, $Q_{11}$ and $Q_{12}$, and it also includes a recirculate flip-flop $Q_{13}$. The set output terminals of the flip-flops $Q_{10}$–$Q_{13}$ are respectively connected to corresponding "and" gates 600, 602, 604, 606 and 608. The bit timing pulses $t_3$ are introduced through an inverter network 610 to the "and" gate 600; the bit timing pulses $t_6$ are introduced to the "and" gate 602, the bit timing pulses $t_5$ are introduced to the "and" gate 604, the bit timing pulses $t_4$ are introduced to the "and" gate 606, and the bit timing pulses $t_2$, $t_3$, $t_4$, $t_5$ and $t_6$ are introduced through an inverter network 612 to the "and" gate 608.

The output terminal $R_0$ of the storage medium 10 is connected to a plurality of "and" gates 614, 616, 618, 620 and 622. These "and" gates are connected through an "or" gate 624 to the input terminal $R_0$ of the sorting network 30.

The output terminal $R_1$ of the storage medium 10 is connected to an "and" gate 626 and to an "and" gate 628. These latter "and" gates are coupled through an "or" gate 630 to the input terminal $R_1$ of the sorting network 30. The output terminal $R_2$ of the storage medium 10 is connected to an "and" gate 632 and to an "and" gate 634. These latter "and" gates are coupled through an "or" gate 636 to the input terminal $R_2$ of the sorting network 30.

The output terminal $R_3$ of the storage medium 10 is connected to an "and" gate 638 and to an "and" gate 640. These "and" gates are coupled through an "or" gate 642 to the input terminal $R_3$ of the sorting network 30. Likewise, the output terminal $R_4$ of the storage medium 10 is connected to an "and" gate 644 and to an "and" gate 646. These latter "and" gates are coupled through an "or" gate 648 to the input terminal $R_4$ of the sorting network 30. The output terminal $R_5$ of the storage medium is connected to an "and" gate 650 and to an "and" gate 652. These "and" gates are coupled through an "or" gate 654 to the input terminal $R_5$ of the sorting network 30.

The term $Q_{10}\cdot t_6$ is introduced to the "and" gate 622, terms $Q_{11}\cdot t_5$ is introduced to the "and" gate 620, and the term $Q_{12}\cdot t_4$ is introduced to the "and" gate 618. The term $Q_{10}\cdot \bar{t}_3$ is introduced to the "and" gates 616, 628, 634, 638 and 646. The term $Q_{10}+Q_{11}+Q_{12}$ is introduced to the "and" gate 650.

The input $R'_0$ to the A register is fed to the sort detection network 537 of FIGURE 6. The output from the read head $R_0$ is applied to a group of "and" gates 660, 662 and 664. The bit timing pulses $t_6$, $t_5$ and $t_4$ are respectively introduced to the "and" gates 660, 662 and 664. These "and" gates are connected to the "or" gates 544 and 546 in the sort detection network 537 of FIGURE 6.

The "sorted" signal from the sort detection network 537 of FIGURE 6 is applied to the reset input terminal of the flip-flop $Q_{12}$ and to the set input terminal of the recirculation flip-flop $Q_{13}$. This "sort" signal is also applied to a pair of "and" gates 666 and 668. The term $Q_{10}$ is applied to the "and" gate 668, and the term $\overline{Q_{10}} \cdot Q_{11}$ is applied to the "and" gate 666.

The "terminate rotation" signal from the "and" gate 556 of FIGURE 6 is applied to the set input terminal of the first final sort flip-flop $Q_{10}$. The output from the "and" gate 668 is applied through an "or" gate 670 to the reset input terminal of the flip-flop $Q_{10}$. The output from the "and" gate 666 is applied through an "or" gate 672 to the reset input terminal of the flip-flop $Q_{11}$.

The "not sorted" signal from the sort detection network 537 of FIGURE 6 is applied to the "or" gate 670 and to an "and" gate 674. The term $\overline{Q_{10}}$ is applied to the "and" gate 674. The output of the "and" gate 674 is applied through the "or" gate 672 to the reset input terminal of the flip-flop $Q_{11}$, and is applied to the set input terminal of the flip-flop $Q_{12}$.

As mentioned above, at the termination of the aforementioned rotation mode, the sixteen higher records are in the F register, whereas the sixteen lower records are distributed throughout the other registers A, B, C, D, and E. The higher registers are sorted in an ascending relationship in the F register. However, the lower records ont not necessarily sorted. The lower records are identified by the $t_3$ control bits only; and the records in the F register are identified by the $t_2$ control bits. In addition eight of the records in the F register may include the $t_6$ control bit, four may include the $t_5$ control bit and two may include the $t_4$ control bit.

At the completion of the aforementioned rotation mode, the output signal from the "and" gate 556 of the system of FIGURE 6 terminates the rotation mode, and this signal is also applied to the first final sort flip-flop $Q_{10}$ to set that flip-flop and initiate the first final sort mode.

The setting of the flip-flop $Q_{10}$ enables the "and" gate 600 which in turn enables the "and" gates 628, 634, 638, 646 and 650. The "and" gates 628, 634, 636 and 646 are disabled at the $t_3$ bit time, so that all the lower records lose their $t_3$ control bits. Therefore, at the end of the first final sort mode, none of the records in the system have a $t_3$ control bit. However, the sorted higher records in the F register, protected by the $t_2$ control bits, merely circulate through the "and" gate 650 during the successive final sort modes.

Also during the first final sort mode, and in a manner similar to the first initial sort mode, the bit $t_6$ is introduced to the records coming out of the A register. This $t_6$ bit is introduced by the "and" gate 622. The first circulate mode then continues until the first record $t_4$ bit at the read head $R_0$ of the one-word register A.

The first final sort mode causes a complete examination of all the records in the E register with respect to the other records in the D, C, B and A registers. At the end of this mode the eight records in the E register, and only those records, are identified by the $t_6$ bits. Of course, since all the sixteen sorted higher records in the F register are identified by the $t_2$ bits, there is no comparison with those records, and they merely recirculate in the F register.

If the sort detection network 537 indicates a sort at the termination of the first final sort mode, the resulting "sorted" signal applied to the "and" gate 668 resets the flip-flop $Q_{10}$, and also resets the flip-flop $Q_{12}$. This causes the system to enter the recirculate mode immediately. However, if there is still not a full sort at the end of the first final sort mode, the resulting "not sorted" signal from the sort detection network 537 resets the flip-flop $Q_{10}$ and sets the second final sort flip-flop $Q_{11}$.

The system then undergoes a second final sort mode, during which the $t_5$ bits are introduced to the circulating words.

Again, should the sort detection network 537 indicate a complete sort, the system will proceed to the final circulate or output mode. However, if the sort detection network 537 indicates that there are still records out of order, the system then proceeds to the third final sort mode. During this third final sort mode, the control bits $t_4$ are introduced. At the termination of the final sort mode, the two records in the C register are both identified by the $t_4$ control bits, and all the records are now in a sorted condition.

The system now enters the final recirculate mode, during which the records in all the registers are permitted to recirculate. This recirculate mode is initiated by the setting of the recirculate flip-flop $Q_{13}$, and the contents from the respective registers recirculate through corresponding "and" gates 614, 626, 632, 640, 644 and 652. The term $Q_{13} \cdot \overline{t_2 \cdot t_3 \cdot t_4 \cdot t_5 \cdot t_6}$ is introduced to the "and" gates, so that all the unity control bits are removed from the records during this final recirculation mode. The recirculation continues until the output flip-flop $Q_{14}$ of the output logic system of FIGURE 8 is set for the output mode.

Figure 8:
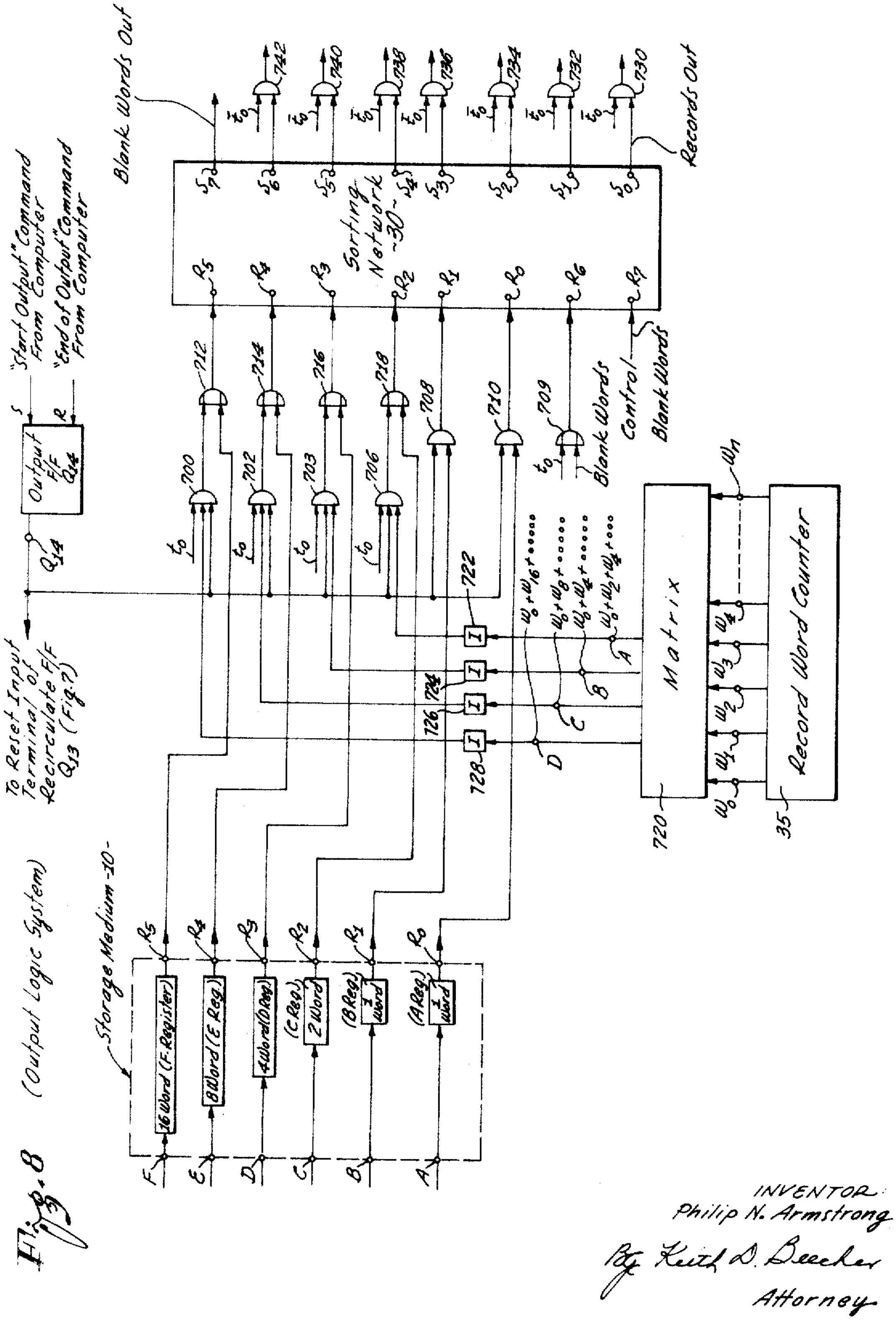

The output logic system of FIGURE 8 is likewise interposed between the storage medium 10 and the sorting network 30. It is to be understood, of course, that the logic systems of FIGURES 6, 7 and 8 are connected as a single logic system between the storage medium 10 and the sorting network 30, by the use of appropriate "or" gates. The single logic system has been separated out into three functional systems in the present application so as to facilitate the description of the invention.

The logic output system includes an output flip-flop $Q_{14}$ which is controlled by the associated computer. For example, the output flip-flop $Q_{14}$ is set by the computer when the computer is to be fed the sorted information from the system of the invention. Then, at the end of the output operation, a suitable "end of output" command from the computer returns the flip-flop $Q_{14}$ to its reset condition. When the flip-flop $Q_{14}$ is set, the recirculate flip-flop $Q_{13}$ is reset, so as to permit the contents of the storage medium 10 to circulate through the logic system of FIGURE 8.

The output logic system of FIGURE 8 includes a plurality of "and" gates 700, 702, 704, 706, 708 and 710, and an "or" gate 709. The "and" gates 700, 702, 704 and 706 are connected through corresponding "or" gates 712, 714, 716, and 718 to the respective input terminals $R_5$, $R_4$, $R_3$ and $R_2$ of the sorting network 30. The "and" gates 708 and 710 are connected respectively to the input terminals $R_1$ and $R_0$ of the sorting network. This "or" gate 709 is connected to the input terminal $R_6$ of the sorting network.

The set output terminal of the output flip-flop $Q_4$ is connected to each of the "and" gates 700, 702, 704, 706, 708 and 710. The bit timing pulses $t_0$ are applied to the "and" gates 700, 702, 704 and 706; and to the "or" gate 709. In addition, the output terminals $R_5$, $R_4$, $R_3$, $R_2$, $R_1$ and $R_0$ of the storage medium 10 are connected to respective ones of the "and" gates 700, 702, 704, 706, 708 and 710.

The record word counter 35 of FIGURE 1 is connected to a matrix 720. The matrix 720 is connected in appropriate manner to respond to the different word timing pulses from the record word counter to produce outputs at the corresponding output terminals A, B, C, and D. The output A, for example, occurs at alternate word times, such as $w_0$, $w_2$, $w_4$. . . . The output B, on the other hand, occurs at each fourth word time, such as $w_0$, $w_4$, $w_8$. . . . The output C, on the other hand, occurs at every eight word time, such as $w_0$, $w_8$, $w_{16}$, $w_{24}$. . . . The output D occurs at every sixteenth word time, such as $w_0$, $w_{16}$, $w_{32}$. . . . The outputs A, B, C and D are connected through respective inverter networks 722, 724, 726, 728, to respective ones of the "and" gates 706, 704, 702 and 700.

The records input terminal $R_6$ of the sorting network 30 is now fed blank words derived, for example, through the "and" gate 582 of FIGURE 6, and through the "or" gate 709. The $t_0$ bits of the blanks are set to unity in the "or" gate 709. At the same time, the control input line connected to the input terminal $R_7$ of the control network also receives blank words, derived, for example, through the "and" gate 578 of FIGURE 6.

The output terminals $S_0$–$S_6$ of the sorting network 30 are connected to corresponding "and" gates 730, 732, 734, 736, 738, 740 and 742. The bit timing pulses $\bar{t}_0$ are also applied to these "and" gates, so that, in each instance, the $t_0$ bits may be returned to 0.

It is evident that when the system is switched from its final recirculate mode to its output mode, the swiching must occur at a proper timing with respect to the word times of the information circulating in the system, so that the records may be read out of the system in the proper sequence, and with either the lower or the higher word in front.

This is achieved in the system of FIGURE 8 in a minimum of access time, and without the necessity to wait for a complete circulation back to a $w_0$ word time condition. In the system of FIGURE 8, and when the output flip-flop $Q_{14}$ is set, the contents of the sorting system are immediately fed out of the system in a sorted condition, and without waiting for $w_0$ word time.

At all times during the final recirculation mode, the smallest record is in the A register and the next in sequence is in the B register. However, the contents of the C register come into the proper position for outputting every second word time. Likewise, the contents of the D register come into position for outputting every four word times, the contents of the E register come into position for outputting every eight word times, and the contents of the F register come into position for outputting every sixteen word times.

In the operation of the output system of FIGURE 8, when the output flip-flop $Q_{14}$ is first set, the "and" gates 708 and 710 are enabled so that the contents of the A and B registers are introduced to the sorting network 30.

Also, the control of the "and" gates 700, 702, 703 and 706 is such that a $t_0$ unit bit is added to the end word in all the registers which are not properly lined up at the particular word time. This causes the contents of those registers merely to circulate back into the same respective registers, since the aforesaid words with the $t_0$ unity bits are all greater than the corresponding blank word applied to the input terminal $R_7$.

The blank words applied to the "or" gate 709 each have a unity $t_0$ bit added, as mentioned above, so that these words always appear at the blank output terminal $S_7$ (since they are greater than any other word in the system).

Under the control of the logic systems of FIGURE 8, and regardless of the word time at which the flip-flop $Q_{14}$ sets the system to the output mode, the sorted records in the system immediately appear serially in sequence at the output terminal $S_0$.

The invention provides, therefore, an improved and simplified system which is capable of rapidly and efficiently sorting data. An important feature of the present invention is the fact that it can sort the data quickly and efficiently, and with a minimum of registers and associated equipment, and with a minimum of storage facilities.

It is apparent, of course, that although a particular embodiment of the invention has been shown and described, modifications may be made. Such modifications are intended to be covered in the following claims.

What is claimed is:

1. A data sorting system including: a sorting network means including a plurality of input terminals and a plurality of output terminals; input circuit means coupled to one of said input terminals of said sorting network means for introducing record words into said system in a random order; a plurality of storage registers having individual input terminals connected to corresponding output terminals of said sorting network means and having individual output terminals; and logic network means coupling said individual output terminals of said storage registers to corresponding input terminals of said sorting network means for introducing predetermined control bits to selected ones of the record words introduced by said input circuit means and including control circuitry responsive to the control bits to cause the record words to be circulated in said system in predetermined manner until said words are at least partially sorted into a predetermined sequence, said logic network means further including an output logic system for introducing control bits to selected ones of said words and responsive to such control bits to cause the record words to be fed out of the system in a selected sequence.

2. The combination defined in claim 1 in which said storage registers are of the dynamic circulating type.

3. The combination defined in claim 1 in which two of said storage registers each have a capacity to provide storage for one of said words and the others of said storage registers have capacities to provide storage for different numbers of said words in a predetermined progression.

4. The combination defined in claim 1 in which said storage registers are of the dynamic circulating type, and in which two of said storage registers each have a capacity to provide storage for one of said words, and the others of said storage registers have respective capacities to provide storage for different numbers of said words in the progression $2^1, 2^2, 2^3, 2^4 \ldots 2^n$.

5. A data sorting system including: sorting network means including a plurality of input terminals and a plurality of output terminals; input circuit means coupled to one of said input terminals of said sorting network means for introducing to the system in a serial bit by bit manner and in a random order multi-bit binary coded record words; a plurality of dynamic circulating storage registers having individual input terminals connected to corresponding output terminals of said sorting network means and having individual output terminals, two of said storage registers each having a capacity to provide storage for one of said words and the remainder of said registers having respective capacities to provide storage for different numbers of said words in the progression $2^1, 2^2, 2^3, 2^4 \ldots 2^n$; and logic network means coupling said individual output terminals of said storage registers to corresponding input terminals of said sorting network means for introducing predetermined control bits to selected ones of the record words introduced by said input circuit means and including control circuitry responsive to the control bits to cause the record words to be circulated in said system in predetermined manners until sorted into a predetermined sequence, said logic network means further including an output logic system for introducing control bits to selected ones of the record words and responsive to such control bits to cause the record words to be fed out of the system in a selected sequence.

6. The sorting system defined in claim 5 in which said logic network means includes an input logic system for introducing a first control bit to selected ones of said words during the introduction thereof into the system by said input circuit means, and in which said logic network means includes control circuitry responsive to the first control bit to produce a predetermined circulation of the record words in the system during the introduction of the record words by said input circuit means.

7. The sorting system defined in claim 5 in which said logic network means includes a sorting logic system for successively introducing control bits of different significance to different groups of the record words during successive circulations thereof in the system, and in which said logic network means includes control circuitry responsive to the control bits to produce such successive circulations.

References Cited

UNITED STATES PATENTS

| | | | |
|---|---|---|---|
| 2,674,733 | 4/1954 | Robbins | 340—172.5 |
| 2,735,082 | 2/1956 | Goldberg et al. | 340—172.5 |
| 3,007,137 | 10/1961 | Page et al. | 340—172.5 |
| 3,013,249 | 12/1961 | Armstrong | 340—172.5 |
| 3,015,089 | 12/1961 | Armstrong | 340—172.5 |
| 3,029,413 | 4/1962 | O'Connor et al. | 340—172.5 |
| 3,034,102 | 5/1962 | Armstrong et al. | 340—172.5 |
| 3,034,103 | 5/1962 | Underwood | 340—172.5 |
| 3,243,782 | 3/1966 | Underwood | 340—172.5 |

ROBERT C. BAILEY, *Primary Examiner.*

J. P. VANDENBURG, *Assistant Examiner.*